(12) United States Patent
Kim et al.

(10) Patent No.: US 7,831,986 B2
(45) Date of Patent: *****Nov. 9, 2010

(54) HIGH-DENSITY RECORDING MEDIUM AND RECORDING AND/OR REPRODUCING DEVICE THEREFOR

(75) Inventors: Jin Yong Kim, Kyunggi-do (KR); Kyung Chan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/566,500

(22) Filed: Sep. 24, 2009

(65) Prior Publication Data

US 2010/0014393 A1   Jan. 21, 2010

Related U.S. Application Data

(63) Continuation of application No. 10/859,124, filed on Jun. 3, 2004, now Pat. No. 7,617,507.

(30) Foreign Application Priority Data

Jun. 3, 2003 (KR) ....................... 10-2003-0035523
Jun. 20, 2003 (KR) ....................... 10-2003-0040353

(51) Int. Cl.
*G11B 7/24* (2006.01)
(52) U.S. Cl. ....................... 720/719; 369/280
(58) Field of Classification Search .............. 369/275.5, 369/282, 272.1, 280; 720/718, 719, 723; 360/135

See application file for complete search history.

(56) References Cited

U.S. PATENT DOCUMENTS 4,634,617 A   1/1987   Ohta et al.
4,683,560 A   7/1987   Takeuchi et al.
5,235,581 A   8/1993   Miyagawa et al.

(Continued)

FOREIGN PATENT DOCUMENTS

CN   1224216 A   7/1999

(Continued)

OTHER PUBLICATIONS

Narahara Tatsuya et al. "Optical Disc System for Digital Video Recording" Japanese Journal of Applied Physics vol. 39 (2000) pp. 912-919, Part 1, No. 2B. XP-001005912.

*Primary Examiner*—Brian E Miller
(74) *Attorney, Agent, or Firm*—Birch, Stewart, Kolasch & Birch, LLP

(57) ABSTRACT

A high-density recording medium including a first surface and a second surface, the second surface being a light incident surface at a normal mounting condition, a clamping area, an information area including a recording layer provided adjacent to the second surface, a transition area extending between the clamping area and the information area, the transition area being defined from an end position of the clamping area to a beginning of the information area, and a slope being formed in the transition area on the first surface. Further, the slope is formed from the end position of the clamping area to a position placed at least a predetermined distance ahead of the start position of the information area, and a gap as a non-slanted area extends between the information area and a closer end of the slope thereto.

25 Claims, 10 Drawing Sheets

U.S. PATENT DOCUMENTS

| | | | |
|---|---|---|---|
| 5,301,183 A | 4/1994 | Minoda et al. | |
| 5,418,766 A | 5/1995 | Fujisawa et al. | |
| 5,448,547 A | 9/1995 | Minoda et al. | |
| 5,476,700 A | 12/1995 | Asai et al. | |
| 5,864,534 A | 1/1999 | Fairchild et al. | |
| 5,999,513 A | 12/1999 | Arakawa et al. | |
| 6,214,430 B1 | 4/2001 | Kim et al. | |
| 6,445,649 B1 | 9/2002 | Saito et al. | |
| 6,507,559 B1 | 1/2003 | Iwaki | |
| 6,532,210 B2 | 3/2003 | Park | |
| 6,576,317 B2 | 6/2003 | Yoshimura et al. | |
| 6,584,067 B2 | 6/2003 | Oshima et al. | |
| 6,747,943 B2 | 6/2004 | Netsu et al. | |
| 6,865,745 B2 | 3/2005 | Myrtle | |
| 7,012,880 B2 | 3/2006 | Kim et al. | |
| 7,027,385 B1 | 4/2006 | Shimazaki et al. | |
| 7,197,756 B2 | 3/2007 | Lee et al. | |
| 7,617,507 B2 * | 11/2009 | Kim et al. | 720/719 |
| 2002/0067689 A1 | 6/2002 | Yamazaki | |
| 2002/0167892 A1 | 11/2002 | Kim et al. | |

FOREIGN PATENT DOCUMENTS

| | | | |
|---|---|---|---|
| CN | 1385848 A | 12/2002 | |
| EP | 0 554 885 A2 | 8/1993 | |
| EP | 0 567 318 A2 | 10/1993 | |
| EP | 1 067 538 A1 | 1/2001 | |
| EP | 1 152 407 A2 | 7/2001 | |
| EP | 1 258 872 A2 | 11/2002 | |
| EP | 1 339 054 A1 | 8/2003 | |
| JP | 6-131696 A | 5/1994 | |
| JP | 08-321072 A | 12/1996 | |
| JP | 9-204686 A | 8/1997 | |
| JP | 10-269620 A | 10/1998 | |
| JP | 10-283683 A | 10/1998 | |
| JP | 11-053764 A | 2/1999 | |
| JP | 11-232701 A | 8/1999 | |
| JP | 11-328728 | 11/1999 | |
| JP | 2000-251324 A | 9/2000 | |
| JP | 2000-322765 A | 11/2000 | |
| JP | 2003-123311 A | 4/2003 | |
| WO | WO 94/28545 A1 | 12/1994 | |
| WO | WO-00/28538 A1 | 5/2000 | |
| WO | WO-02/45082 A1 | 6/2002 | |

* cited by examiner

_Normal Insert_

_Error Insert_

FIG. 6
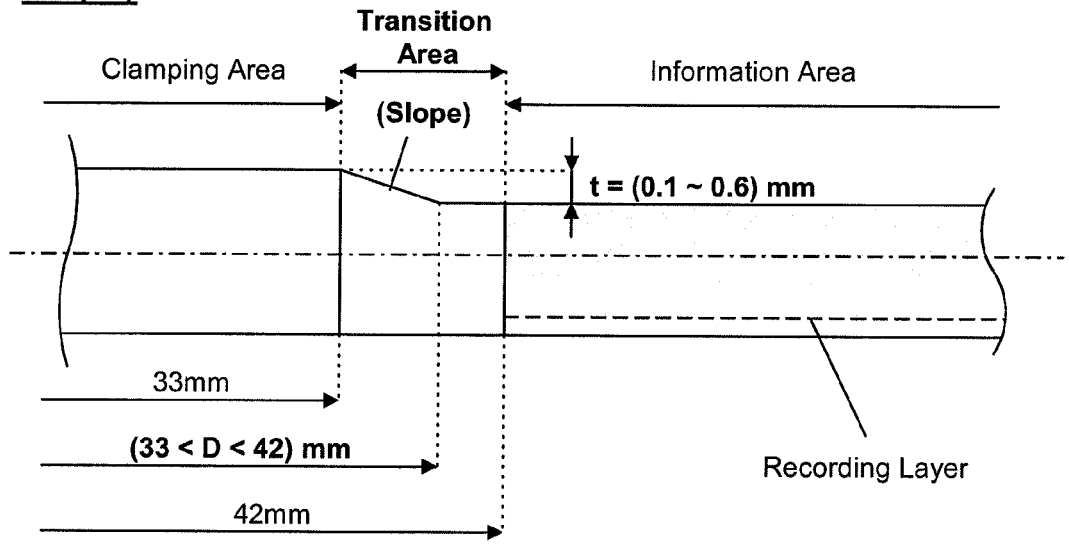
FIG. 7
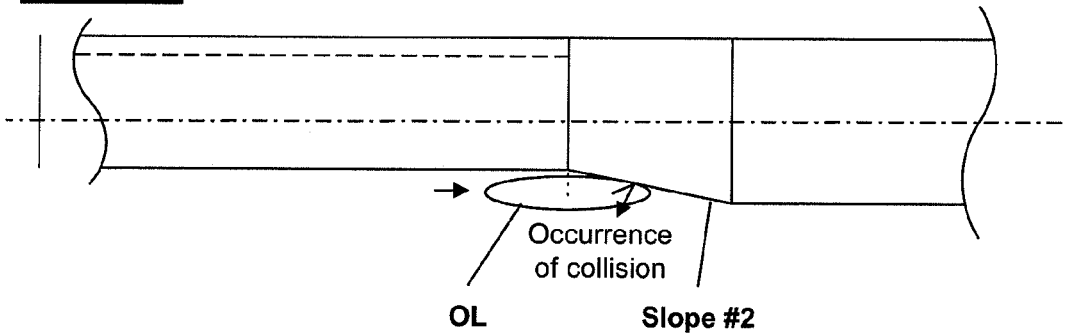
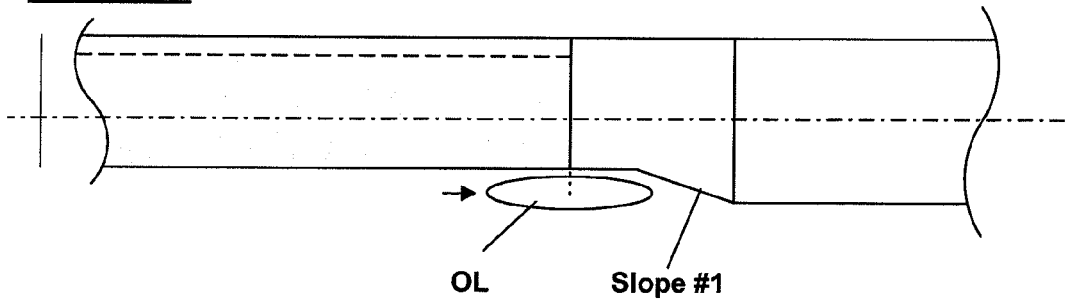

Normal Insert

Error Insert

FIG. 13
*Disc #1*
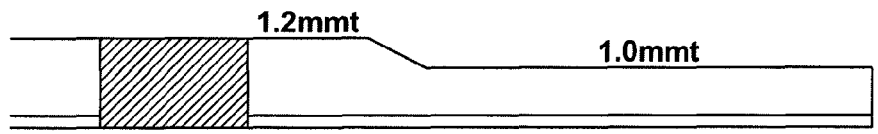
*Disc #2*
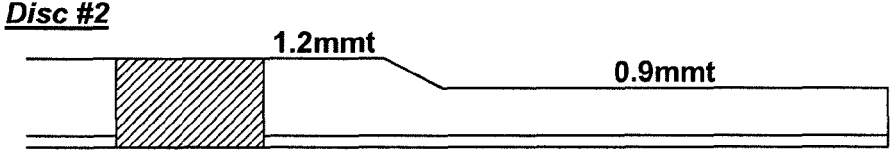
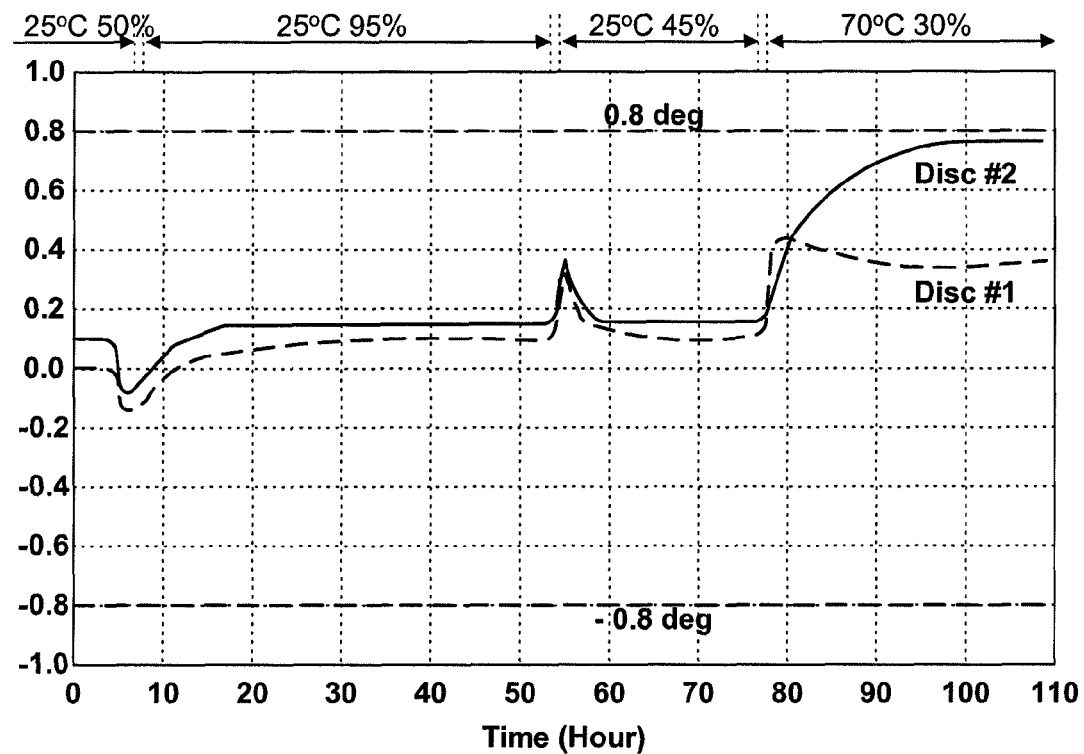

Loading
Unloading
Caught due to step

Loading
Unloading
Not caught by provision of slope at step 30 degrees
1.0mm (Minimum width of transition area)
0.6mm (Maximum height of step)
* Width of transition area : 1.0 ~ 3.5mm

HIGH-DENSITY RECORDING MEDIUM AND RECORDING AND/OR REPRODUCING DEVICE THEREFOR

This Nonprovisional application is a Continuation application of application Ser. No. 10/859,124 (U.S. Pat. No. 7,617,507 B2), filed on Jun. 3, 2004, which claims priority under 35 U.S.C. §119(a) on Patent application Ser. No(s). 10-2003-0035523 and 10-2003-0040353 filed in KOREA on Jun. 3, 2008 and Jun. 20, 2003, respectively, the entire contents of which are hereby incorporated by reference.

1. TECHNICAL FIELD

The present invention relates to a high-density recording medium, e.g., an optical disc and a recording and/or reproducing device therefor, and more particularly to a high-density optical disc that is capable of not colliding with an objective lens of an optical pickup when the high-density optical disc, such as a BD (Blu-ray disc), is improperly placed in an optical disc recording and/or reproducing device, e.g., when the high-density optical disc is placed upside down in the optical disc device, and an optical disc recording and/or reproducing device.

2. BACKGROUND ART

As shown in FIG. 1, a general CD (compact disc) is formed with a thickness of 1.2 mm and a diameter of 120 mm. Also, the CD has a center hole of 15 mm in diameter, and a clamping area of 44 mm in diameter, which is formed around the center hole. The clamping area is securely placed on a turntable provided in an optical disc device by means of a clamper also provided in the optical disc device.

A data recording layer of the CD, on which data is recorded in a pit pattern, is spaced approximately 1.2 mm from the surface of the CD facing an objective lens OL of an optical pickup provided in the optical disc device. The objective lens OL, which is used in the optical pickup for the CD, has a relatively small numeral aperture NA. For example, the objective lens OL has an NA of 0.45.

As shown in FIG. 2, a general DVD (digital versatile disc) is formed with a thickness of 1.2 mm and a diameter of 120 mm. Also, the DVD has a center hole of 15 mm in diameter, and a clamping area of 44 mm in diameter, which is formed around the center hole. The clamping area is securely placed on a turntable provided in an optical disc device by means of a clamper also provided in the optical disc device.

A data recording layer of the DVD, on which data is recorded in a pit pattern, is spaced approximately 0.6 mm from the surface of the DVD facing an objective lens OL of an optical pickup provided in the optical disc device. The objective lens OL, which is used in the optical pickup for the DVD, has a relatively large numeral aperture NA. For example, the objective lens OL has an NA of 0.6.

As shown in FIG. 3, a high-density optical disc, standardization of which has been under discussion recently, such as a BD (Blu-ray disc), is formed with a thickness of 1.2 mm and a diameter of 120 mm. Also, the BD has a center hole of 15 mm in diameter, a clamping area of 33 mm in diameter, which is formed around the center hole and securely placed on a turntable provided in an optical disc device by means of a clamper also provided in the optical disc device, and a transition area of 42 mm in diameter, which is allocated between the clamping area and an information area.

A data recording layer of the BD, on which data is recorded in a pit pattern, is spaced approximately 0.1 mm from the surface of the BD facing an objective lens OL of an optical pickup provided in the optical disc device.

The objective lens of the optical pickup for the BD has the largest numeral aperture NA. For example, the objective lens has an NA of 0.85. The optical pickup for the BD uses a laser beam having a short wavelength to reproduce data recorded in a high-density pit pattern or record data in a high-density pit pattern, as compared to the optical pickup for the CD or the DVD.

Specifically, the laser beam having a short wavelength and the objective lens having a much larger numeral aperture are used in the optical pickup for the BD. Consequently, a small spot of a laser beam having an increased amount of light can be focused on the recording layer in a state in which the objective lens of the optical pickup for the BD is closer to the recording layer of the BD. Furthermore, the light transmittance distance of the laser beam having a short wavelength can be shortened, whereby property change of the laser beam and occurrence of aberration are minimized.

When a BD 10 is properly placed on a turntable 11 provided in the optical disc device, as shown in FIG. 4, a general servo operation is carried out as follows. The BD 10 is rotated at high speed by means of a spindle motor 12, a motor driver 13, and a servo controller 15. While the BD 10 is rotated, the objective lens OL of an optical pickup 14, which is also provided in the optical disc device, focuses on the BD 10 based upon a focusing servo operation, by which the objective lens OL of the optical pickup 14 is vertically moved within the range of a prescribed working distance WD. After the focusing servo operation is carried out, data recorded on the disc is normally read or data is normally recorded on the disc.

When the BD 10 is improperly placed on the turntable 11 of the optical disc device, however, for example, when the BD 10 is placed upside down on the turntable 11, as shown in FIG. 5, the recording layer of the BD 10 improperly placed on the turntable 11 is, from the objective lens OL, farther by at least 1.0 mm than that of the BD 10 properly placed on the turntable 11.

In this case, the objective lens OL cannot focus on the BD 10 simply by a normal focusing operation for moving the objective lens OL vertically although the BD 10 is rotated at high speed by means of the spindle motor 12, the motor driver 13, and the servo controller 15. Consequently, the objective lens OL is upwardly moved toward the recording layer of the BD 10 until it moves to the maximum working distance WD_Max under the control of the servo controller 15 for controlling the focusing servo operation. As a result, the objective lens OL comes into collision with the BD 10, which may cause the BD 10, the objective lens OL, or an actuator for supporting the objective lens OL to be damaged, or otherwise cause the servo operation to have fatal errors.

3. DISCLOSURE OF INVENTION

Therefore, the present invention has been made in view of the above problems, and it is an object of the present invention to provide a high-density optical disc that is capable of not colliding with an objective lens of an optical pickup provided in an optical disc device although the objective lens is upwardly moved toward a recording layer of the high-density optical disc until it moves to the maximum working distance when the high-density optical disc, such as a BD (Blu-ray disc), is improperly placed in the optical disc device, e.g., when the high-density optical disc is placed upside down in the optical disc device, and an optical disc device therefor.

In accordance with one aspect of the present invention, the above and other objects can be accomplished by the provision of a high-density recording medium, comprising: a clamping area; an information area; and a transition area between the clamping area and the information area, wherein a step from top surface in the transition area to the top surface in the information area is formed to have a slope down smoothly to the top surface of the information area.

In accordance with another aspect of the present invention, there is provided a high-density recording medium, comprising: a clamping area; an information area the thickness of which is smaller than that of the clamping area; and a transition area between the clamping area and the information area, wherein a step is formed at the transition area, and wherein a data recording layer is formed at a lower position with respect to the middle of the disc in the thickness direction of the disc.

In accordance with another aspect of the present invention, there is provided an apparatus for recording and/or reproducing data on or from a high density recording medium, comprising: an optical pickup for reading or recording data from or on a high-density recording medium; and a servo controller controlling the optical pickup to carry out a servo operation, wherein the optical pickup reads or records data from or on a recording layer of an information area based on the control of the servo controller, the information area having thickness smaller than that of a clamping area of the high-density recording medium, wherein a transition area formed between the clamping area and the information area, a step formed at the transition area, and the recording layer formed at a lower position with respect to half thickness of the recording medium.

In accordance with another aspect of the present invention, there is provided an apparatus for recording and/or reproducing data on or from a high density recording medium, comprising: an optical pickup for reading or recording data from or on a high-density recording medium, wherein the high-density recording medium having a clamping area, an information area, and a transition area between the clamping area and the information area, and a step from top surface in the transition area to the top surface in the information area is formed to have a slope down smoothly to the top surface of the information area; and a servo controller controlling the optical pickup to carry out a servo operation to read or record data from or on a recording layer of information area.

In accordance with yet another aspect of the present invention, there is provided a system for recording or reproducing data on or from a high-density recording medium, comprising: a high-density recording medium, the recording medium comprising a clamping area, an information area, and a transition area between the clamping area and the information area, wherein a step from top surface in the transition area to the top surface in the information area is formed to have a slope down smoothly to the top surface of the information area, and a recording layer located at a lower portion with respect to half thickness of the information area; and a recording/reproducing device which is able to insert the high-density recording medium, and operable to record or reproduce data on or from the high-density recording medium.

4. BRIEF DESCRIPTION OF DRAWINGS

The accompanying drawings, which are included to provide a further understanding of the invention, illustrate the preferred embodiments of the invention, and together with the description, serve to explain the principles of the present invention.

FIG. 6 is a cross-sectional view showing a high-density optical disc according to a preferred embodiment of the present invention;

FIG. 7 is a view showing that the high-density optical disc does not collide with an objective lens by the provision of a sloping step according to the present invention;

FIGS. 10 to 15 illustrate high-density optical discs according to the present invention and results of experiments on the high-density optical discs.

Features, elements, and aspects of the invention that are referenced by the same numerals in different figures represent the same, equivalent, or similar features, elements, or aspects in accordance with one or more embodiments.

5. MODES FOR CARRYING OUT THE INVENTION

Now, a high-density optical disc and an optical disc device for reading data recorded on such a high-density optical disc and recording data on such a high-density optical disc according to a preferred embodiment of the present invention will be described in detail with reference to the accompanying drawings.

Figure 1:
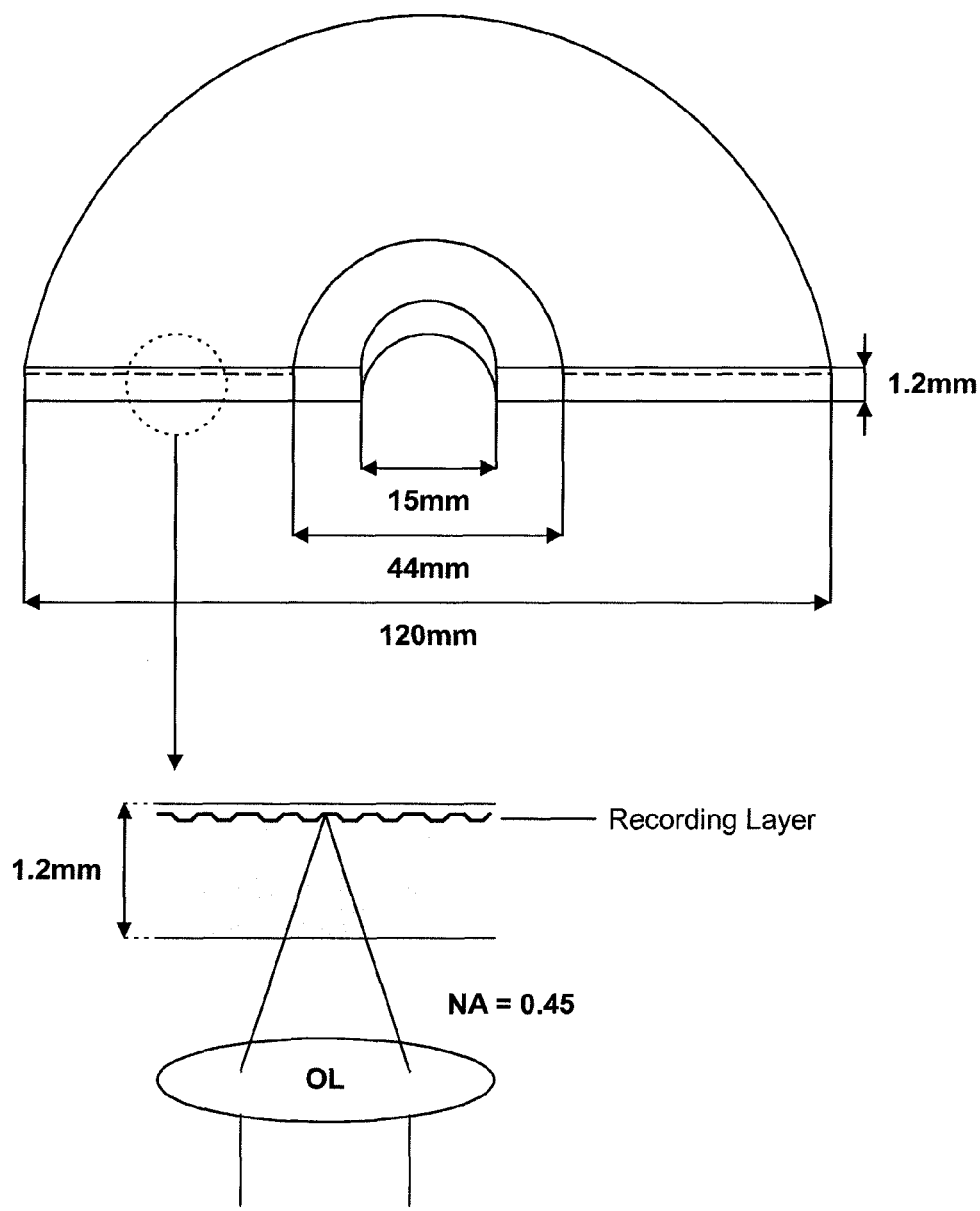
FIG. 1 is a view showing the disc structure of a general CD (compact disc)
Figure 2:
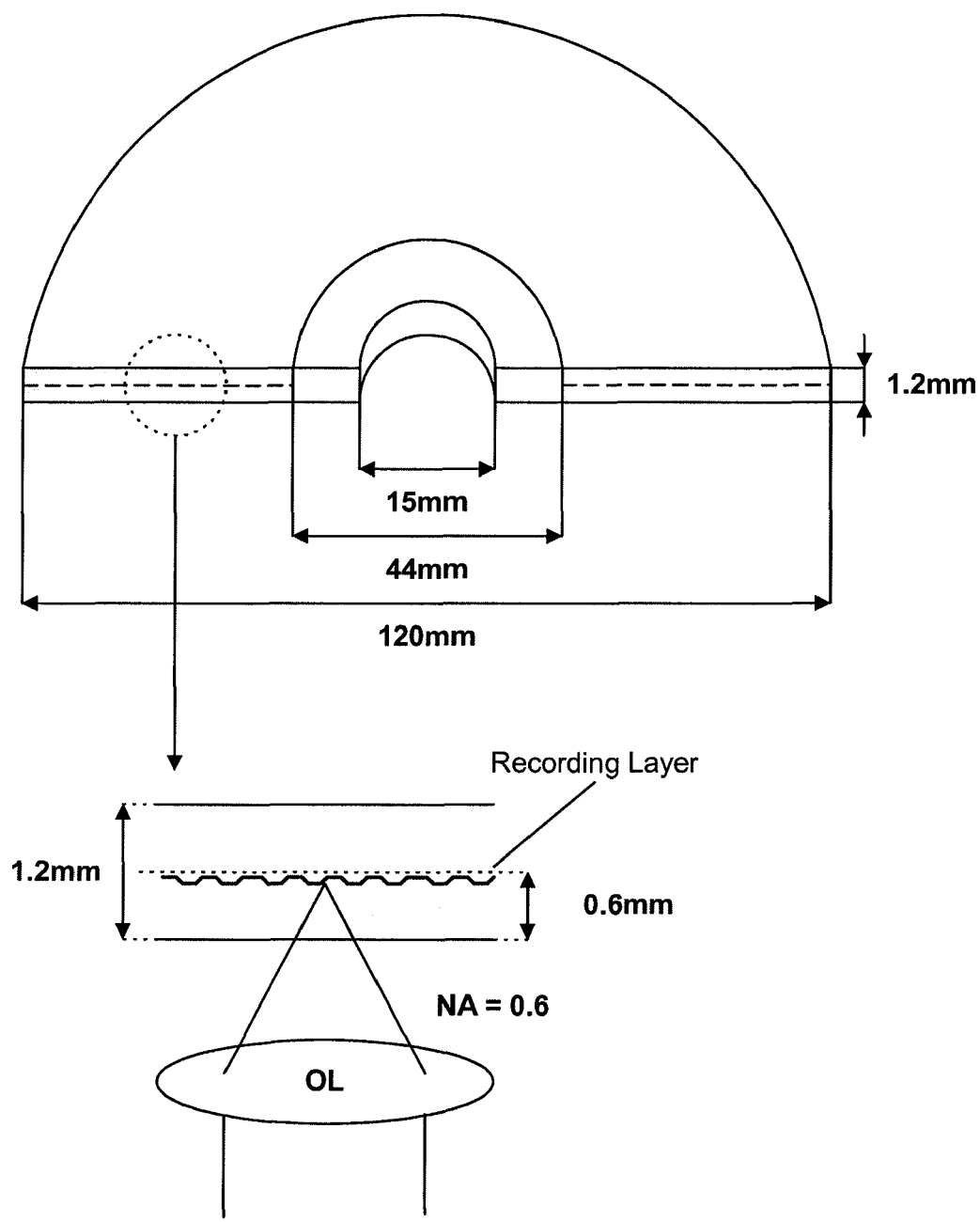
FIG. 2 is a view showing the disc structure of a general DVD (digital versatile disc)
Figure 3:
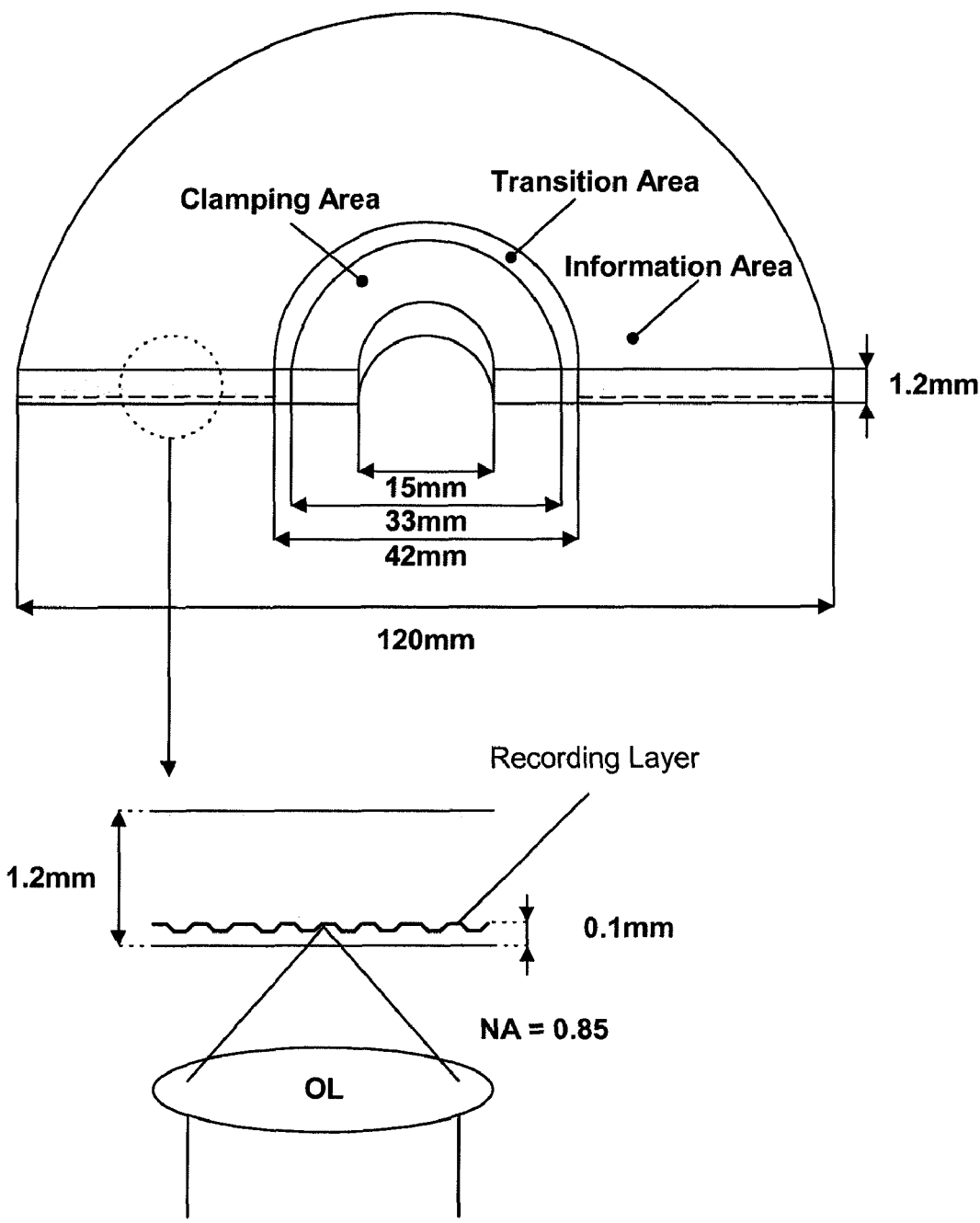
FIG. 3 is a view showing the disc structure of a general BD (Blu-ray disc)
Figure 4:
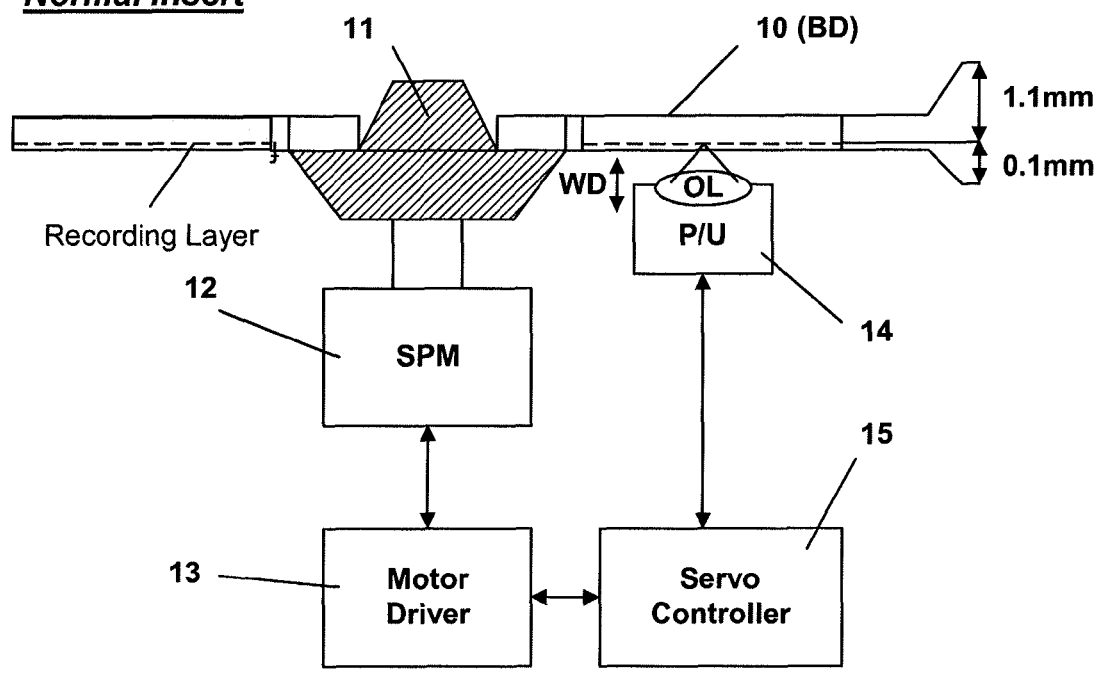
FIG. 4 is a view showing the BD properly placed in a general optical disc device.
Figure 5:
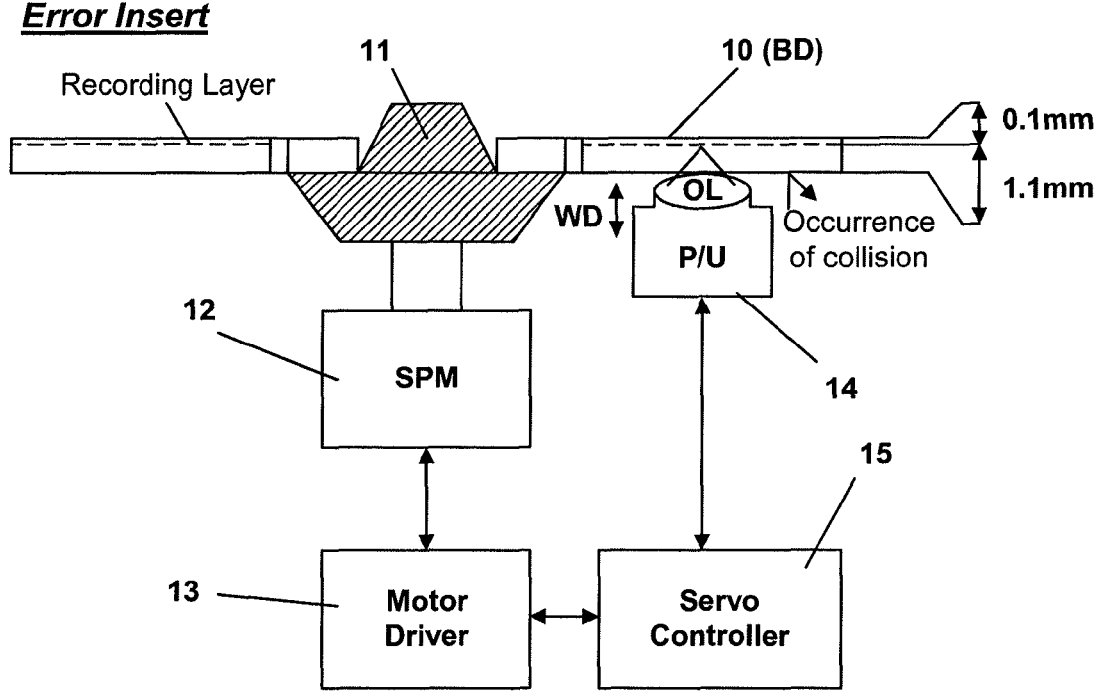
FIG. 5 is a view showing the BD improperly placed in the general optical disc device.

FIG. 6 is a cross-sectional view showing a high-density optical disc according to a preferred embodiment of the present invention. As already described above with reference to FIG. 3, the high-density optical disc, for example, a BD (Blu-ray disc) 20 is formed with a thickness of 1.2 mm and a diameter of 120 mm. Also, the BD 20 has a center hole of 15 mm in diameter, a clamping area of 33 mm in diameter, which is formed around the center hole and securely placed on a turntable provided in the optical disc device by means of a damper also provided in the optical disc device, and a transition area of 42 mm in diameter, which is allocated between the clamping area and an information area.

A data recording layer of the BD 20, on which data is recorded in a pit pattern, is spaced approximately 0.1 mm from the surface of the BD 20 facing an objective lens of an optical pickup provided in the optical disc device. The BD 20 is formed such that the thickness of the clamping area is different from that of the information area. For example, the transition area of the BD 20 includes a sloping step having a prescribed thickness t of 0.1 to 0.6 mm at the surface of the BD 20 at a longer distance from the data recording layer of the BD 20, as shown in FIG. 6. Consequently, the thickness of the information area is 0.1 to 0.6 mm smaller than that of the clamping area.

The step is formed to prevent a collision of the objective lens of the optical pickup with the BD 20 although the objective lens is upwardly moved toward the recording layer of the BD 20 to focus on the recording layer until it moves to the maximum working distance when the BD 20 is improperly placed on the turntable of the optical disc device, e.g., when the BD 20 is placed upside down on the turntable. Specifically, the step of 0.1 to 0.6 mm in thickness is formed from the end position of the clamping area to the starting position of the information area while having a prescribed slope in order to provide a prescribed gap distance between the BD 20 and the objective lens, as shown in FIG. 6.

When a BD having a sloping step formed from the end position of the clamping area, which has a diameter of 33 mm, to the starting position of the information area, which has a diameter of 42 mm, is placed upside down in the optical disc device (Example 1), the objective lens OL of the optical pickup collides with the BD as the objective lens OL is maximally moved in the horizontal direction.

In a BD according to a preferred embodiment of the present invention, the sloping step is partially formed on the transition area. For example, the sloping step of the BD is formed from the end position of the clamping area, which has a diameter of 33 mm, to the position placed 2.0 mm ahead of the starting position of the information area, which has a diameter of 42 mm. Consequently, the objective lens OL of the optical pickup does not collide with the BD although the objective lens OL is maximally moved in the horizontal direction when the BD is placed upside down in the optical disc device (Example 2).

The sloping step may be formed with a maximum slope length of 3.5 mm (=(40 mm−33 mm)/2) in the radial direction of the disc on the basis of the center hole of the optical disc. Also, the sloping step may have a minimum slope length of 1.8 mm (=(40 mm−36.4 mm)/2) in the radial direction of the disc, considering that the clamping area may be extended above its diameter of 33 mm. It is preferable, however, that the sloping step has a minimum slope length of 1.0 mm (=(40 mm−38 mm)/2) in consideration of manufacturing deviation of the optical disc. Consequently, the sloping step preferably has a slope length of 1.0 mm to 3.5 mm in the radial direction of the disc in the embodiment of the present invention.

Figure 8:
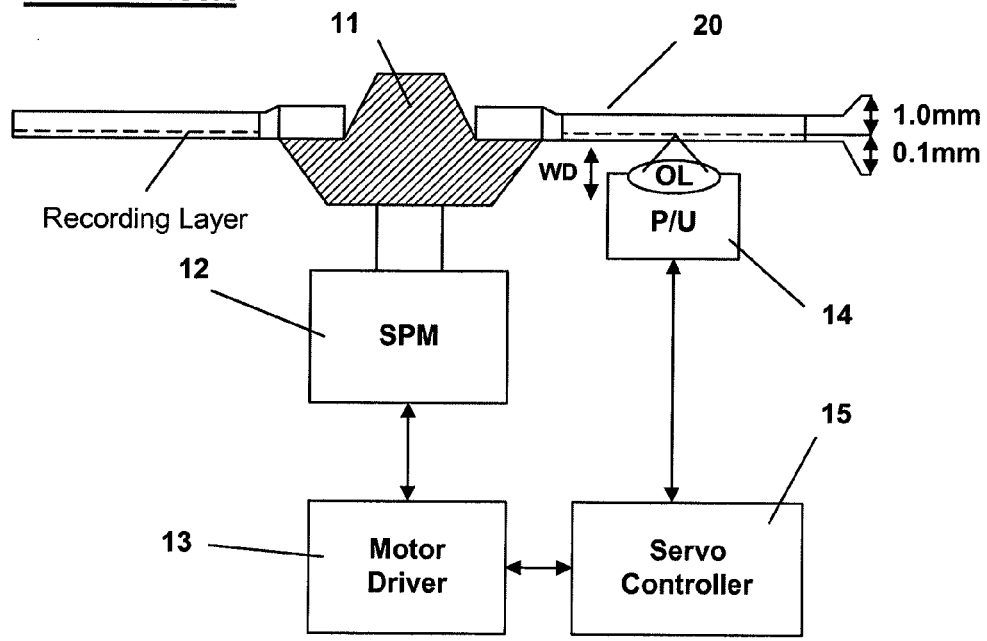
FIG. 8 is a view showing the high-density optical disc according to the present invention properly placed in an optical disc device.

When the BD 20 is properly inserted into the optical disc device as shown in FIG. 8, the clamping area of the BD 20 is safely placed on the turntable 11. In this case, the thickness of the clamping area is not changed, whereby stable clamping force is maintained. Furthermore, the thickness of the information area is reduced so that a relatively small centrifugal force is generated when the BD 20 is rotated at high speed, whereby more stable clamping force is guaranteed.

While the BD 20 is rotated at high speed by means of the spindle motor 12, the motor driver 13, and the servo controller 15, the objective lens OL of the optical pickup 14 is vertically moved within the range of a prescribed working distance to carry out a focusing servo operation. After the focusing servo operation is carried out, data recorded on the disc is normally read, or data is normally recorded on the disc.

Figure 9:
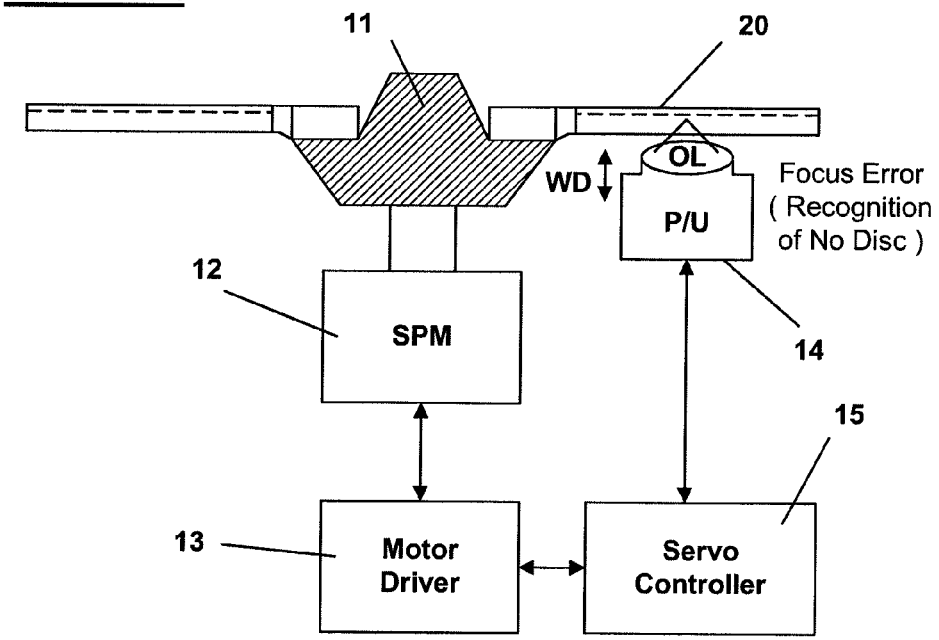
FIG. 9 is a view showing the high-density optical disc according to the present invention improperly placed in the optical disc device.

Even when the BD 20 is improperly inserted into the optical disc device, for example, the BD 20 is inserted upside down into the optical disc device as shown in FIG. 9, the clamping area of the BD 20 is safely placed on the turntable 11. In this case, however, a gap distance of 0.1 to 0.6 mm is formed between the surface of the clamping area placed on the turntable 11, facing the objective lens OL and the surface of the information area facing the objective lens OL by means of the sloping step formed at the transition area of the BD 20.

Consequently, the objective lens OL of the optical pickup 14 does not collide with the BD 20 although the objective lens OL of the optical pickup 14 is maximally moved in the vertical direction to carry out a focusing servo operation while the BD 20 is rotated at high speed by means of the spindle motor 12, the motor driver 13, and the servo controller 15. Furthermore, the data recording layer of the BD 20 is spaced apart from the surface of the BD 20 facing the objective lens OL, whereby no normal focusing operation is carried out, and thus it is recognized that no disc is in the optical disc device.

Moreover, the maximum working distance of the objective lens OL is further increased, which is advantageous to carry out the focusing servo operation. The thickness of the information area of the BD 20 is reduced below 1.2 mm, whereby the cost of materials required to manufacture the BD 20 is decreased. In the case that the BD 20 is manually inserted into a slot-type optical disc drive, the BD 20 may collide with the optical disc drive due to the step formed at the BD 20. However, a shock due to the collision of the BD 20 with the optical disc drive is minimized by means of the sloping shape of the step, whereby smooth insertion of the BD 20 into the optical disc drive is possible.

Figure 10:
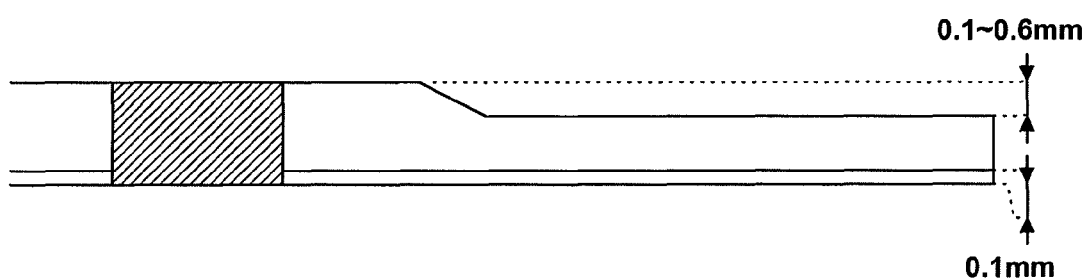

The reason why the sloping step having a thickness of 0.1 mm to 0.6 mm is formed at the transition area of the BD will now be described. As shown in FIG. 10, the maximum thickness of the clamping area of the BD is 1.3 mm. Consequently, the thickness of an injection-molded substrate is 1.2 mm with the exception of a cover layer of 0.1 mm in thickness.

When the step is formed on the surface of the BD opposite to the cover layer so that the information area and the rim area are manufactured while the thickness of the information and rim area is smaller than that of the clamping area, for example, the thickness of the injection-molded substrate at the information area and the rim area is 0.6 mm, which is the same as a general DVD, a transcription property of grooves or pits formed at the recording surface during the injection molding is not deteriorated as in the DVD.

Consequently, when the thickness of the clamping area is 1.2 mm as shown in FIG. 10, the substrate at the information area and the rim area can be easily manufactured without deterioration of injection-molding and transcription properties as long as the thickness of the substrate at the information area and the rim area is 0.6 mm. As a result, the step having a thickness of up to 0.6 mm can be formed between the clamping area and the information area.

When the cover layer of 0.1 mm in thickness is formed on the recording surface of the BD, it is possible to manufacture a BD having a clamping area whose thickness is 1.3 mm, an information area whose thickness is 0.7 mm, and a rim area whose thickness is 0.7 mm. When the minimum thickness of the clamping area is 1.15 mm, and the thickness of the step is 0.6 mm, the thickness of the information area and the rim area is 0.55 mm. Consequently, the thickness of the injection-molded substrate is 0.45 with the exception of the thickness of the cover layer, which is 0.1 mm. In this case, however, the injection-molded substrate having a thickness of 0.45 mm can be practically manufactured.

Figure 11:
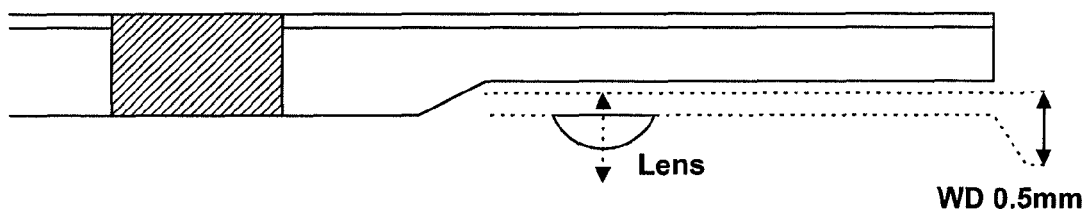

On the other hand, the reason why the minimum thickness of the step is set to 0.1 mm is as follows. Even when the objective lens for the BD having a numeral aperture of 0.85 has a large working distance, for example, approximately 0.5 mm or more, as shown in FIG. 11, a collision of the objective lens with the BD is prevented by the provision of the step having a thickness of at least 0.1 mm. Specifically, a collision of the objective lens with the BD is effectively prevented even when the distance in which the objective lens can be vertically moved to carry out the focusing servo operation is 0.5 mm in the direction close to the recording surface of the disc and 0.5 mm in the direction away from the recording surface of the disc on the basis of the focusing position. When the working distance of the objective lens is large, the effect of prevention of the collision of the objective lens with the BD is increased as the step of the BD has a larger thickness. When the working distance of the objective lens is small, however, the collision of the objective lens with the BD can still be prevented although the step of the BD has a small thickness.

Figure 12:
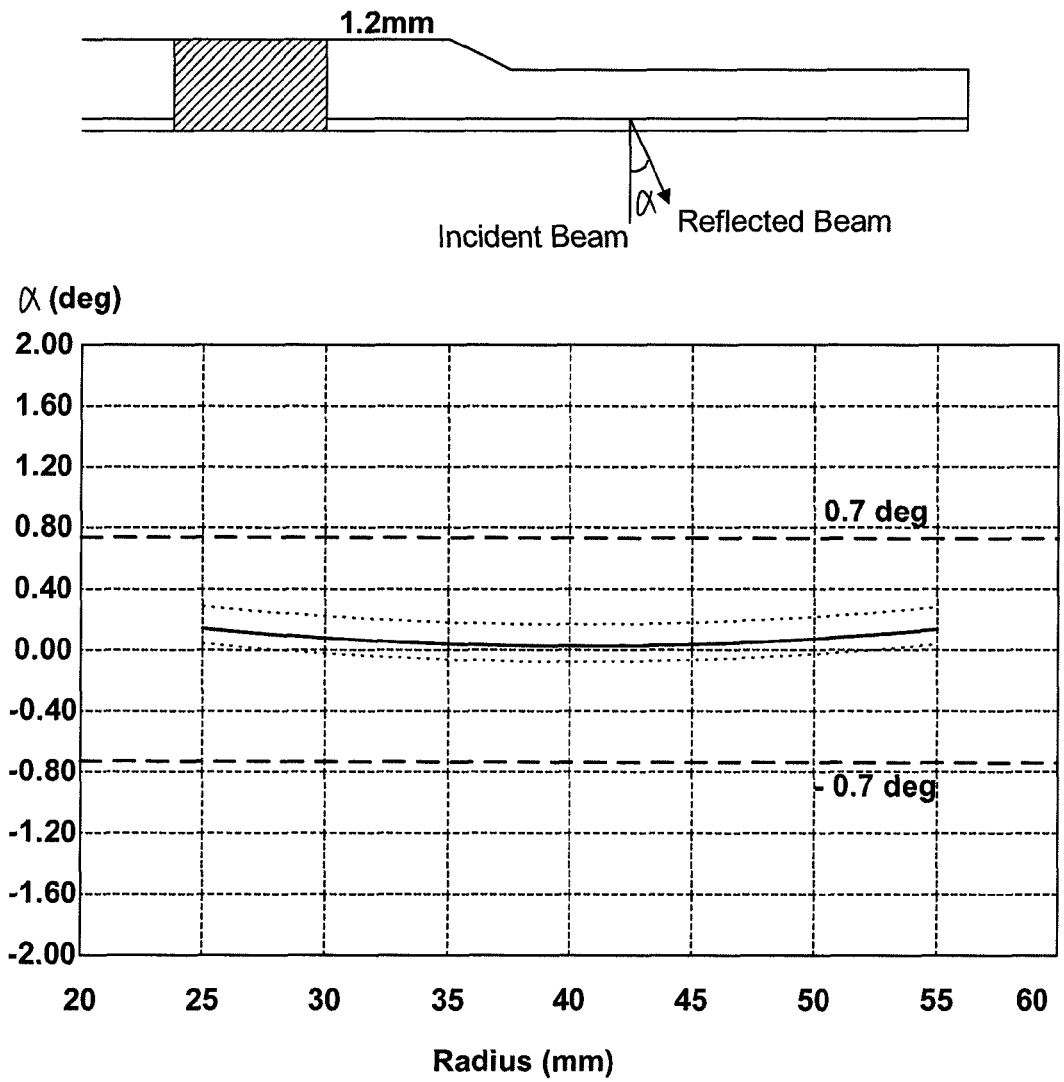

When the injection-molded substrate having a thickness of 1.1 mm/0.8 mm and the cover layer having a thickness of 100 μm are manufactured with polycarbonate, as shown in FIG. 12, so that the thickness of the clamping area is 1.2 mm, and the thickness of the information area and the rim area is 0.9 mm, the radial angular deviation α has the maximum value ($\alpha$=0.70 degree), which is required under normal test conditions applied to the BD, i.e., a temperature of 23±2° C., a relative humidity of 45% to 55%, and an atmospheric pressure of 86 kPa to 106 kPa.

When the injection-molded substrate is made of polycarbonate as shown in FIG. 13, the angular deviation ($\alpha$=0.80 degree) is satisfied under the sudden change test conditions of the BD, i.e., a condition in which the relative humidity is changed from 95% to 45%, and the temperature is 25° C., which is unchanged, and another condition in which the relative humidity is changed from 45% to 30.0%, and the temperature is changed from 25° C. to 70° C. while a prescribed level of the absolute humidity is maintained, as long as the thickness of the disc, i.e., the thickness of the disc in information area is at least 0.9 mm. However, it is difficult to satisfy the above-mentioned conditions when the thickness of the disc is below 0.9 mm. Consequently, it is preferable to set the minimum thickness of the disc to 0.9 mm when the injection-molded substrate is made of polycarbonate. However, it is possible to manufacture a disc having a thickness of below 0.9 mm when the injection-molded substrate is made of one of other plastic materials having higher strength than that of the polycarbonate.

Figure 14:
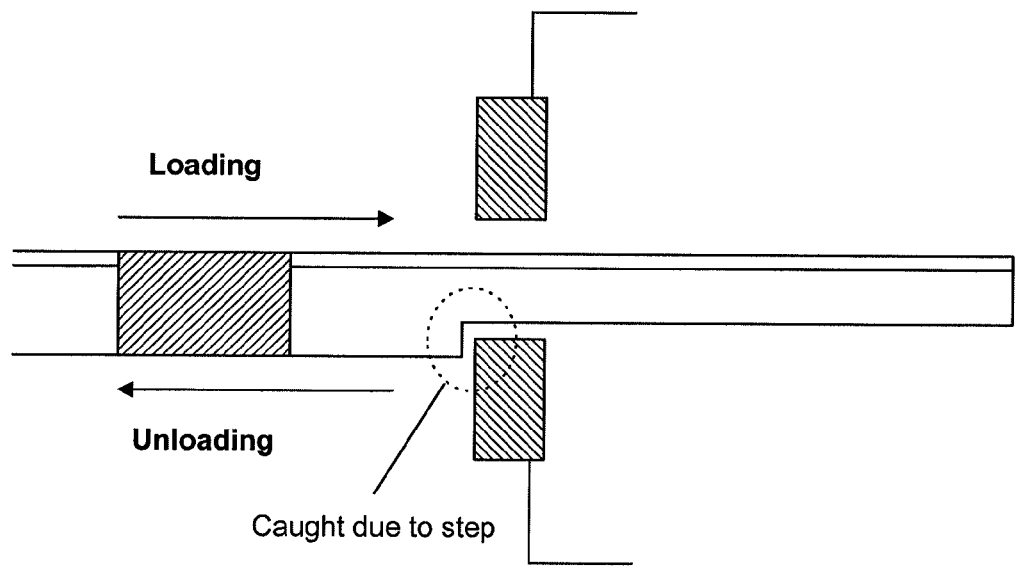
Figure 15:
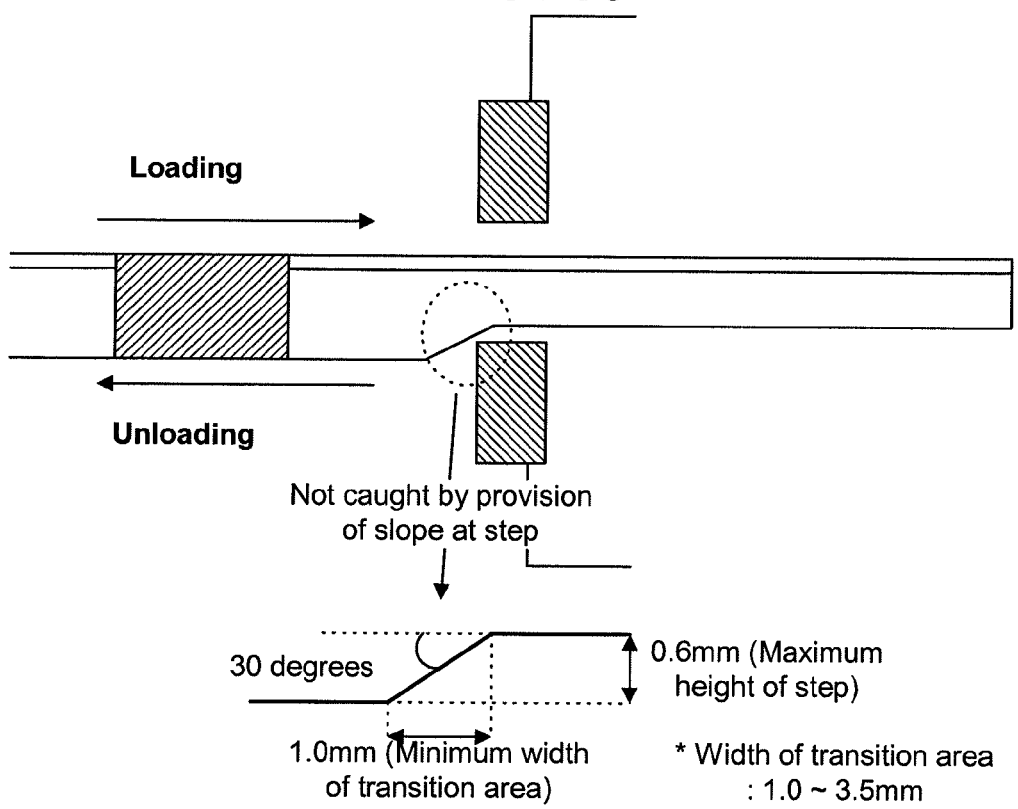

When the disc is directly loaded into or unloaded from a slot-type disc drive, which has no tray, as shown in FIG. 14, the disc may be caught by the disc drive due to the vertical step formed at the disc, which leads to a failure to load the disc into the disc drive. When the disc is manufactured such that the sloping angle of the step is not more than 30 degrees (=0.6 mm/1.0 mm) as shown in FIG. 15, however, the disc is not caught by the disc drive due to the slope provided at the step.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, the step formed at the transition area of the disc may have other shapes in addition to the aforesaid sloping shape.

As apparent from the above description, the present invention provides a high-density optical disc wherein a prescribed gap distance between the high-density optical disc and an objective lens of an optical pickup provided in an optical disc device is increased. Consequently, the present invention has an effect of preventing a collision of the high-density optical disc with the objective lens of the optical pickup, whereby damage to the high-density optical disc or the objective lens of the optical pickup is prevented, and fatal errors of a servo operation are effectively prevented.

The invention claimed is:

1. A high-density recording medium, comprising:
    a first surface and a second surface, the second surface being a light incident surface at a normal mounting condition;
    a clamping area;
    an information area including a recording layer provided adjacent to the second surface;
    a transition area extending between the clamping area and the information area, the transition area being defined from an end position of the clamping area to a start position of the information area; and
    a slope being formed in the transition area on the first surface,
    wherein the slope is formed from the end position of the clamping area to a position placed at least a predetermined distance ahead of the start position of the information area, and
    wherein a gap as a non-slope area extends between the information area and a closer end of the slope thereto.

2. The recording medium as set forth in claim 1, wherein the predetermined distance is 2.0 mm.

3. The recording medium as set forth in claim 1, wherein the high-density recording medium is a Blue-ray disc™.

4. The recording medium as set forth in claim 1, wherein the recording layer is located at a distance of about 0.1 mm from the second surface.

5. The recording medium as set forth in claim 1, wherein the transition area extends between 33 mm diameter and 42 mm diameter of the recording medium.

6. The recording medium as set forth in claim 1, wherein the slope has a thickness 0.1 mm<t<0.6 mm.

7. The recording medium as set forth in claim 1, wherein the slope has a thickness so as not to collide with an objective lens of an optical pickup to focus on the recording layer.

8. The recording medium as set forth in claim 1, wherein the slope has a maximum slope length of 3.5 mm.

9. The recording medium as set forth in claim 1, wherein the slope has a minimum slope length of 1.8 mm.

10. The recording medium as set forth in claim 1, wherein the slope ends at 40 mm diameter of the recording medium.

11. The recording medium as set forth in claim 1, wherein the clamping area has a thickness of maximum 1.3 mm.

12. The recording medium as set forth in claim 1, wherein the information area has a thickness of minimum 0.9 mm.

13. The recording medium of claim 1, wherein the second surface covering the clamping area, the transition area and the information area is substantially coplanar.

14. An apparatus for recording data on a high density recording medium, comprising:
    an optical pickup configured to record data on the recording medium, the recording medium having a first surface and a second surface, the second surface being a light incident surface at a normal mounting condition, a clamping area, an information area having a recording layer provided adjacent to the second surface, a transition area extending between the clamping area and the information area and being defined from an end position of the clamping area to a start position of the information area, and slope being formed in the transition area on the first surface; and
    a servo controller configured to control the optical pickup to carry out a servo operation to record data on the recording medium,
    wherein the slope is formed from the end position of the clamping area to a position placed at least a predetermined distance ahead of the start position of the information area, and
    wherein a gap as a non-slope area extends between the information area and a closer end of the slope thereto.

15. The apparatus of claim 14, further comprising:
    a clamping unit configured to clamp the clamping area of the recording medium by a predetermined force.

16. The apparatus of claim 14, wherein the optical pickup includes an objective lens, and the objective lens has a working distance in a vertical direction to focus the recording layer by the control of the servo controller.

17. The apparatus of claim 16, wherein the servo controller is further configured to control the objective lens to move in vertical direction up to maximum working distance to focus the recording layer when the recording medium is placed upside down on a turntable.

18. The apparatus of claim 17, wherein the servo controller is further configured not to focus the recording layer even if the objective lens is moved to the maximum working distance when the recording medium is placed upside down on a turntable.

19. The apparatus of claim 18, wherein the servo controller is further configured not to generate a signal for indicating a focus error, thereby determining that no recording medium is inserted in the apparatus.

20. An apparatus for reproducing data from a high density recording medium, comprising:
   an optical pickup configured to read data from the recording medium, the recording medium having a first surface and a second surface, the second surface being a light incident surface at a normal mounting condition, a clamping area, an information area having a recording layer provided adjacent to the second surface, a transition area extending between the clamping area and the information area and being defined from an end position of the clamping area to a start position of the information area, and slope being formed in the transition area on the first surface; and
   a servo controller configured to control the optical pickup to carry out a servo operation to read data from the recording medium,
   wherein the slope is formed from the end position of the clamping area to a position placed at least a predetermined distance ahead of the start position of the information area, and
   wherein a gap as a non-slanted area extends between the information area and a closer end of the slope thereto.

21. The apparatus of claim 20, further comprising:
   a clamping unit configured to clamp the clamping area of the recording medium by a predetermined force.

22. The apparatus of claim 20, wherein the optical pickup includes an objective lens, and the objective lens has a working distance in vertical direction to focus the recording layer by the control of the servo controller.

23. The apparatus of claim 22, wherein the servo controller is further configured to control the objective lens to move in vertical direction up to maximum working distance to focus the recording layer when the recording medium is placed upside down on a turntable.

24. The apparatus of claim 23, wherein the servo controller is further configured not to focus the recording layer even if the objective lens is moved to the maximum working distance when the recording medium is placed upside down on a turntable.

25. The apparatus of claim 24, wherein the servo controller is further configured to generate a signal for indicating a focus error, thereby determining that no recording medium is inserted in the apparatus.

\* \* \* \* \*